United States Patent [19]

Abramov

[11] Patent Number: 4,577,345

[45] Date of Patent: Mar. 18, 1986

[54] FINGERPRINT SENSOR

[76] Inventor: Igor Abramov, 3620 Spencer St., #50, Torrance, Calif. 90503

[21] Appl. No.: 597,124

[22] Filed: Apr. 5, 1984

[51] Int. Cl.[4] ............................................. G06K 9/00
[52] U.S. Cl. .................................... 382/4; 340/825.34
[58] Field of Search ............................ 382/4; 324/71.1;
340/825.3, 825.31, 825.32, 825.33, 825.34;
357/26; 178/18, 19, 20

[56] References Cited

U.S. PATENT DOCUMENTS

| | | | |
|---|---|---|---|
| 3,584,958 | 9/1968 | Miller | 382/4 |
| 3,781,855 | 12/1973 | Killen | 382/4 |
| 4,429,413 | 1/1984 | Edwards | 382/4 |
| 4,484,026 | 11/1984 | Thornburg | 178/20 |

*Primary Examiner*—Leo H. Boudreau
*Assistant Examiner*—Jacqueline Todd
*Attorney, Agent, or Firm*—Edward A. Sokolski; Edward J. DaRin

[57] ABSTRACT

An electrical method and apparatus for sensing the pattern of ridges and valleys on an individual's finger to provide binary electrical signals representative of the sensed pattern. The fingerprint sensor is constructed and defined with an integrated circuit chip having an array of sensing circuits arranged thereon in rows and columns for defining X, Y coordinates. One of the electrodes for each sensing circuit is connected to a contact pad that is electrically exposed on the surface of the integrated circuit chip at a location corresponding to the X, Y coordinate for the individual sensing circuit. A pressure sensitive membrane having a conductive surface facing the array of contact pads is utilized for translating the fingerprint pattern into a conductive pattern of ridges and valleys. The conductive pattern is pressed into electrical engagement with each contact pad opposite a fingerprint ridge. While the conductive pads are in electrical engagement with the membrane, the sensing circuits are sequentially scanned in a preselected timed relationship to produce a binary electrical signal from each sensing circuit having its individual contact pad in circuit relationship with the membrane. The output signals from the rows and columns of sensing signals represent the portion of the fingerprint pattern representative of a ridge. The binary output signals can be processed by known techniques for comparing the sensed fingerprint with known fingerprint patterns.

6 Claims, 10 Drawing Figures

Fig. 4.
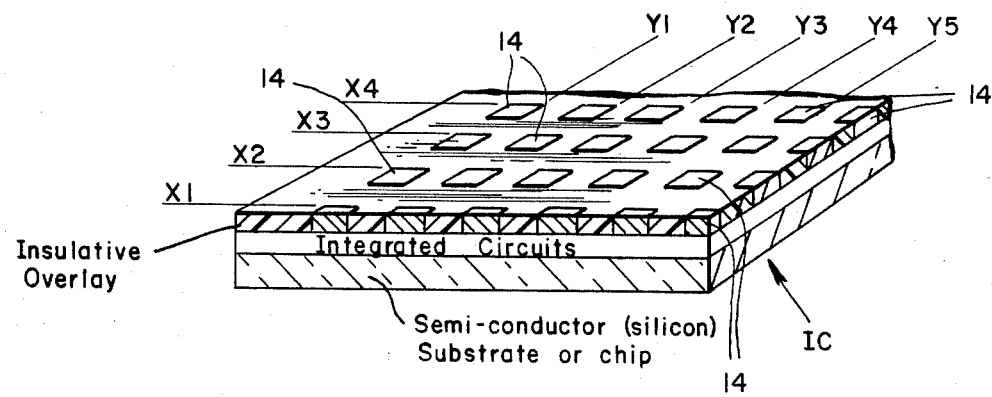
Fig. 6.
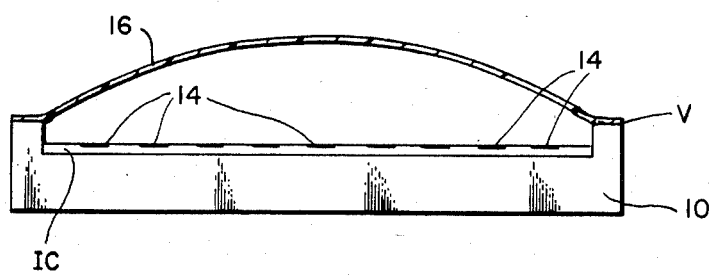
Fig. 7.
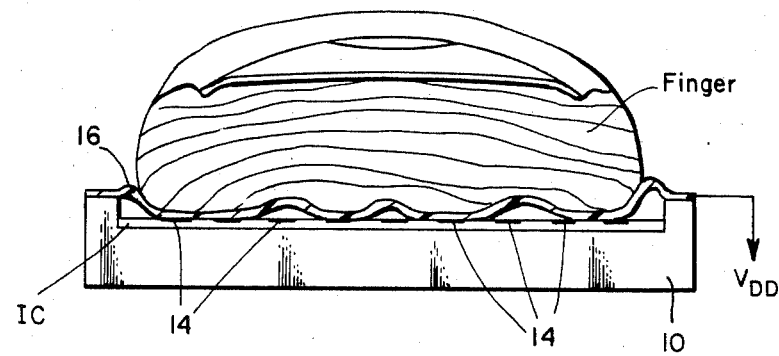
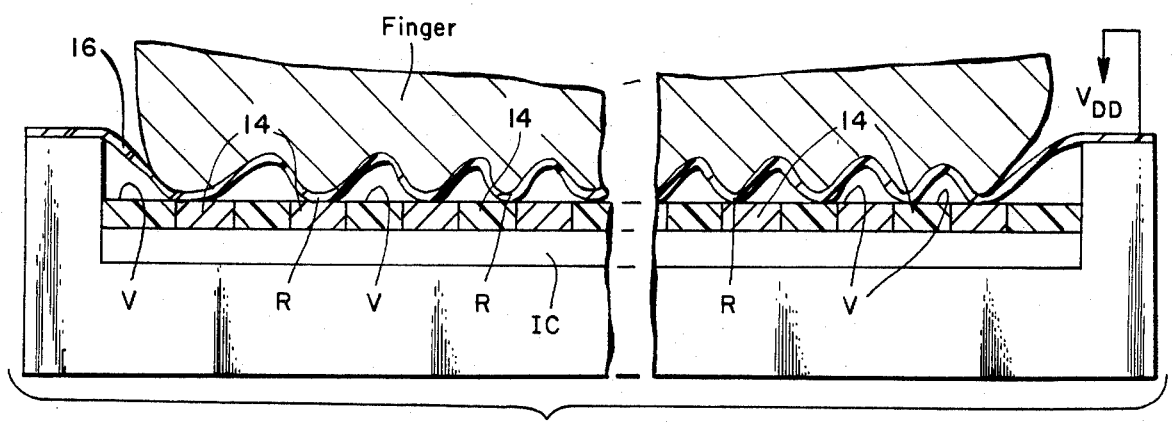
Fig. 8.

FINGERPRINT SENSOR

FIELD OF INVENTION

This invention relates to electrical methods and apparatus for sensing and identification of fingerprints, and more particularly, to methods and apparatus for sensing a fingerprint pattern of ridges and valleys of an individual for translating the physical finger pattern to binary coded electrical signals representative of the sensed pattern.

BACKGROUND OF INVENTION

Fingerprints have been conventionally recorded by the application of an individual's finger to an ink pad and then applying the inked finger to a record sheed to reproduce the fingerprint pattern on the record sheet. The more sophisticated fingerprint sensing, recording and identification techniques usually resort to devices based on optical techniques for this purpose. The majority of the identification systems based on optical fingerprint sensing and acquisition provide a fairly precise image of the fingerprint but they appear to suffer from the contamination of the sensor by the finger oils, perspiration, etc. One optical system known to me that overcomes this problem is described in U.S. Pat. No. 4,322,163. The optical system described in U.S. Pat. No. 4,322,163 overcomes the problems of prior art optical sensors by introducing a deformable mirror membrane into the device for sensing the finger pattern. It appears, however, that the optical system disclosed in the U.S. Pat. No. 4,322,163 patent also has some disadvantages, such as the requirement for movable mechanical elements, fragile optical elements and a gas laser. All of these devices lower the reliability, increase the physical size, and increase the cost of such optical fingerprint sensing systems. Moreover, the optical information gained from the deformable mirror, as disclosed in the U.S. Pat. No. 4,322,163 is intrinsically analog, that is, ambiguities may be present in the signals. This problem is apparent in any optically based direct fingerprint acquisition system.

There are also presently known electrical techniques for sensing fingerprints and converting the fingerprint pattern to electrical signals. Some of these are disclosed in U.S. Pat. Nos. 4,353,056 and 4,394,773. The devices seem to be either highly theoretical devices, or devices that have not been introduced into the marketplace and therefore appear to suffer from the lack of practical implementation. Other electrical techniques have been developed for touch sensing, including for use in conjunction with robotics. Most of these robotic devices are either too complex or have too low a resolution to be employed for sensing fingerprint patterns. Accordingly, there is a present need for an improved, reliable, and low cost fingerprint sensor that will convert the ridges and valleys of an individual's finger pattern to electrical signals to allow the electrical signals to be processed by known computer techniques or other well known fingerprint identification techniques. Preferably, the electrical signals that are generated in transforming the fingerprint pattern are strictly digital signals, thus minimizing any sensing ambiguities.

SUMMARY OF INVENTION

The present invention provides an improved electrical fingerprint sensor that may be constructed as an integrated circuit on a semi-conductor substrate or chip to provide a low cost, reliable, and highly accurate device to directly sense and record an individual's fingerprint pattern. A fingerprint pattern of ridges and valleys is advantageously translated from an individual's finger to a corresponding conductive pattern of ridges and valleys on a membrane applied to an array of switching circuits deposited on the semiconductor substrate to change the conductive condition of the electrical switches to generate an electrical pattern of binary signals that corresponds to the valleys and ridges of the fingerprint pattern. The signals derived from the array of switching circuits produce strictly digital or binary information, thereby minimizing the ambiguities of prior art devices. The output signals may be readily processed by computer techniques or any other known conventional fingerprint identification system. In addition to the conventional use of fingerprint identification for law enforcement, the sensor of the present invention may be utilized for identification in conjunction with the use of credit cards, banking, and retail sales. The device of the present invention may also be utilized as an electronic, high security lock for automobiles, office buildings, homes, and computer equipment, among others.

From a broad method standpoint, the invention comprehends a method of sensing the fingerprint pattern of ridges and valleys of an individual for translating the physical pattern to binary coded electrical signals representative of the sensed pattern. The method includes the steps of providing an integrated circuit having a plurality of individual, insulatively spaced transistor switching circuits deposited thereon in an array of rows and columns with a row electrode common to each row of transistor switching circuits and a column electrode common to each column of switching circuits, impressing a conductive pattern of ridges and valleys derived from an individual's fingerprint pattern of ridges and valleys onto the array of switching circuits to place the conductive ridges into electrical conductive relationship with the switching circuits underlying the ridges of the fingerprint to condition the nonconducting circuits for conduction. The condition circuits are then sequentially rendered conductive for providing a binary output signal from each of the conditioned circuits representative of the individual row and individual column of the switching circuit and thereby the corresponding coordinate location of the portion of the physical ridge on the individual's fingerprint pattern to thereby electrically reproduce the sensed pattern.

From an apparatus standpoint, the invention comprehends a finger sensor for transforming the fingerprint pattern of ridges and valleys of an individual into corresponding binary electrical output signals. The sensor comprises a semiconductor waver having an array of row and column electrodes arranged thereon in an insulatively spaced-apart relationship for defining X and Y coordinates. Individual transistor switching circuit means are provided for each of the X and Y coordinates and arranged in a normally nonconductive condition with the individual row and column electrodes. Each transistor has first, second, and third electrodes. The first electrode is electrically connected to an individual row electrode, while the second electrode is connected to an individual column electrode. An array of electrical contact pads corresponding to the array of switching circuit means is arranged in an insulatively spaced relationship on the semiconductor wafer in accordance with the X and Y coordinates and which pads are electrically exposed on the semiconductor wafer. The third electrode for each transistor is electrically connected to an individual contact pad corresponding to the individual X and Y coordinate for the individual transistor. Means are provided for holding the semiconductor wafer with the array of individual contact pads electrically exposed from one side of the holding means. A pressure sensitive membrane having an electrically conductive surface is secured to the holding means with the conductive surface overlying the contact pads in a preselected spaced relationship therewith. The membrane is characterized as being responsive to the pressure exerted thereon by an individual's finger to cause the membrane to temporarily reproduce the fingerprint pattern of ridges and valleys on the membrane, so as to cause the conductive surfaces of the membrane reproducing the fingerprint ridges to form an electrical circuit with the array of contact pads corresponding to the X and Y coordinates of the fingerprint ridges, while maintaining a spaced relationship with the contact pads at the X and Y coordinates for the fingerprint valleys. Circuit means are provided for sequentially scanning the row and column electrodes in a preselected timed relationship to produce electrical output signals from each transistor switching circuit that is individual to a contact pad that is in electrical circuit relationship with said membrane. A binary electrical output signal is produced from each transistor circuit at a time when a scanning signal is coupled to an individual row electrode in substantial coincidence with a scanning signal for the corresponding column electrode at the time an electrical circuit relationship exists between the third electrodes of an individual switching circuit, a contact pad and the membrane, whereby each of the output signals represents different X and Y coordinates of the fingerprint ridges of an individual's fingerprint pattern.

BRIEF DESCRIPTION OF THE DRAWINGS

These and other features of the present invention may be more fully appreciated when considered in the light of the following specification and drawings, in which:

FIG. 4 is a diagrammatic, partial representation of an integrated circuit chip that forms a portion of the sensor of FIG. 3;

FIG. 6 is a further embodiment of the fingerprint sensor of FIG. 3 showing an alternate arrangement of the sensing membrane with the sensing apparatus of FIG. 3;

FIG. 7 is a diagrammatic representation of the fingerprint sensing apparatus of FIG. 6 illustrating the deformed relationship of the sensing membrane when finger pressure is applied thereto;

FIG. 8 is a partial, enlarged view of the fingerprint sensing apparatus of FIGS. 3 and 6 illustrating the relationship between the conductive surface of the sensing membrane, the ridges and valleys on a finger, and the contact pads of the integrated circuit chip underlying the ridges and valleys of the fingerprint;

DETAILED DESCRIPTION OF THE PREFERRED EMBODIMENT

Figure 1:
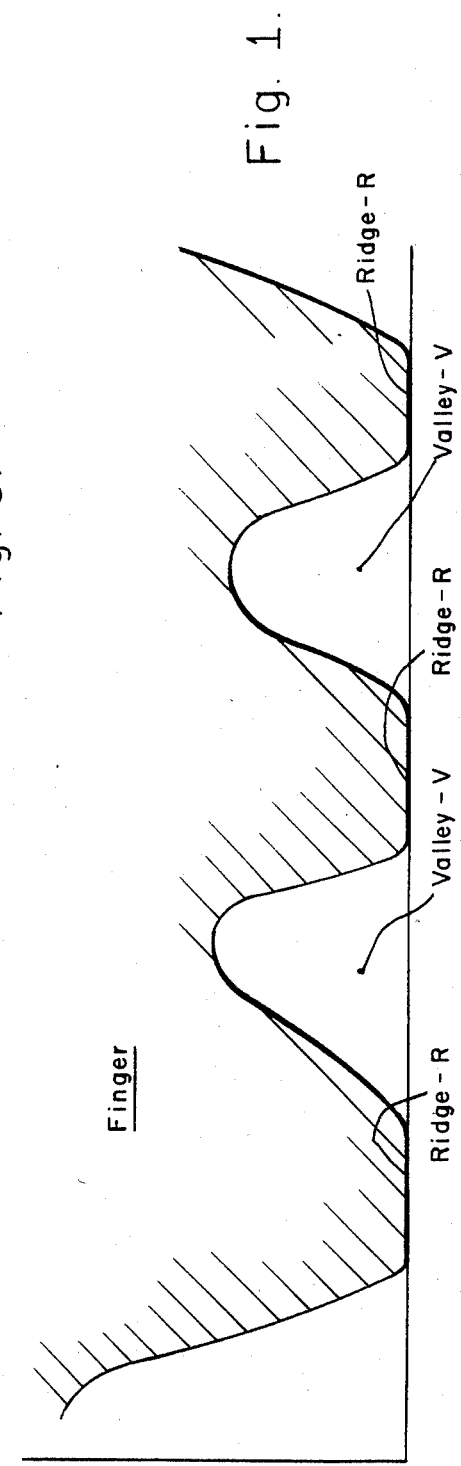
FIG. 1 is an enlarged diagrammatic representation of a human finger showing the ridges and valleys of the finger pressed against a sensing surface and extending along a horizontal axis.
Figure 2:
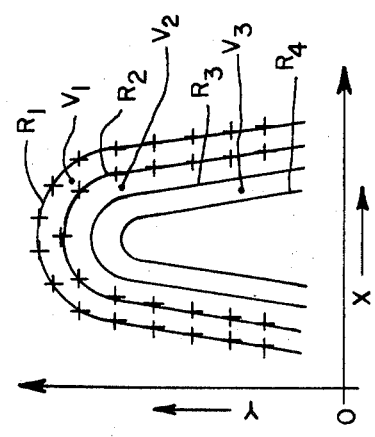
FIG. 2 is a diagrammatic representation of a fingerprint pattern on an X and Y coordinate scale indicating by a cross the portions of a pair of fingerprint ridges that would be identified by their X and Y coordinates in accordance with the present invention.

Now referring specifically to the drawings, the method and apparatus of fingerprint sensing of the present invention may be described in detail. Initially, to better understand the present invention, a fingerprint configuration for an individual will be briefly examined in accordance with FIG. 1. FIG. 1 essentially shows an enlarged diagrammatic representation of the ridges and valleys of a fingerprint pattern of a human being as the finger may be pressed against a surface which is illustrated in FIG. 1 as a horizontal axis. The fingerprint ridges R are illustrated as being pressed against the horizontal axis with the valleys V being spaced from the same axis. The present invention, therefore, takes advantage of this basically digital arrangement of ridges and valleys by sensing the ridges R and providing binary electrical output signals corresponding to the sensed ridges and providing no output signals for the areas comprehended by the valleys V between the ridges R. The development of an electrical pattern representing the pattern of ridges and valleys of the fingerprint can be appreciated by examining FIG. 2 wherein the multiplicity of spaced ridges R1, R2, R3, and R4 separated by valleys $V_1$, $V_2$, and $V_3$ are illustrated in a typical fingerprint pattern. The ridges R1 and R2 are illustrated with an overlay of crosses to identify typical sensing points on the ridges R that are represented by an output signal in accordance with the present invention for electrically reproducing the locations of the ridges on the horizontal and vertical grid. Accordingly, each cross identifies a particular X and Y coordinate that can be utilized to reproduce the sensed pattern of ridges and valleys by means of the resulting electrical signals.

Figure 3:
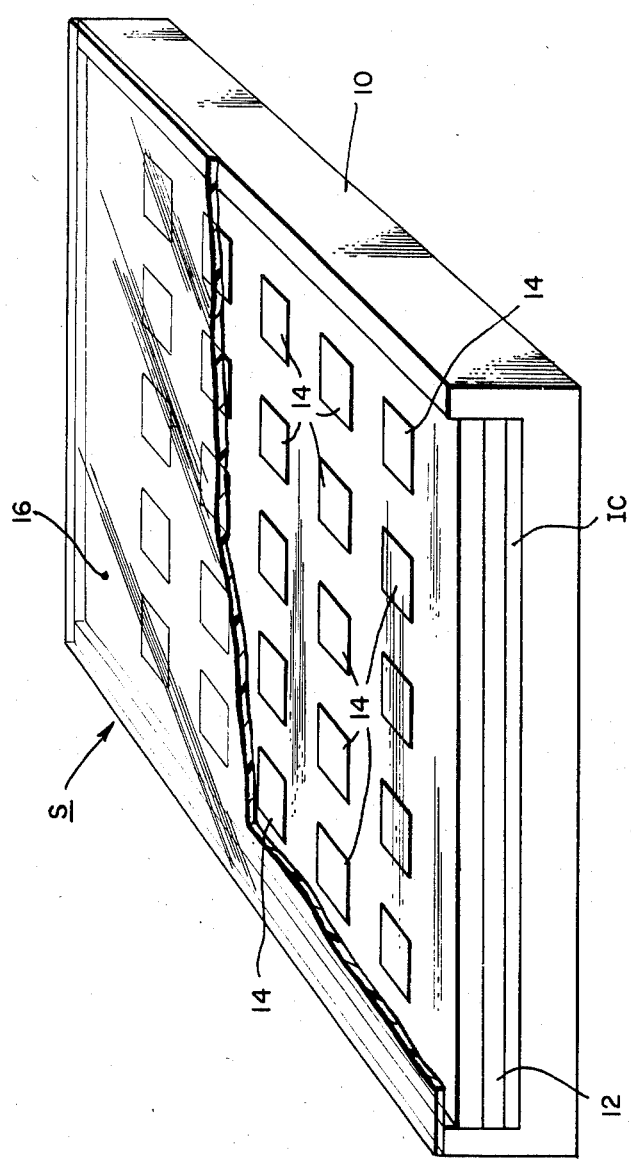
FIG. 3 is a diagrammatic representation of the fingerprint sensing apparatus, with a portion broken away, and embodying the present invention.

Now specifically referring to FIG. 3, the overall configuration of a fingerprint sensor S embodying the present invention will be examined. Fingerprint sensor S comprises a holder 10 that mounts an integrated circuit chip IC within the holder as illustrated with an electrically insulative protective layer 12 deposited over the integrated circuit chip IC. The insulative layer 12 is defined to permit electrical access to a multiplicity of electrical contact pads 14 that are arranged in rows and columns for sensing the various coordinates of the ridges R of the fingerprint pattern, as will be evident immediately hereafter. Overlying the insulative layer 12 and the array of conductive pads 14 is a conductive membrane 16 that is secured to the edges of the holder 10 and arranged in a preselected insulatively spaced relationship with the contact pads 14. The edges of the membrane 16 are preferably secured to the holder 10 by a pliable supporting means for improved translation of the fingerprint pattern. In the arrangement of the membrane 16 illustrated in FIG. 3, the membrane is secured to the holder 10 in a horizontal, spaced relationship across the top of the holder. In the preferred embodiment of the sensor S, the membrane 16 is arranged in a concave relationship with respect to the holder 10 and captures a volume of air between the lower surface of the membrane 16 and the top of the insulative layer 12 overlying the integrated circuit IC. It is believed that a more precise reproduction of the fingerprint pattern is obtained through the use of the configuration for the membrane 16 of FIG. 6 due to the greater pressure required by the individual to depress the membrane 16 against the integrated circuit contact pads 14. This deformed arrangement of the conductive membrane 16 is illustrated in FIG. 7 with the individual's finger illustrated thereon and in an enlarged relationship with the membrane to indicate the contacts between the conductive ridges R on the membrane 16, as translated from the fingerprint pattern, and the contact pads 14.

An important aspect of the sensor S is the integrated circuit chip IC. The integrated circuit chip IC is diagramatically illustrated in FIG. 4 wherein a semiconductor substrate or chip, which may be in the form of a silicon semiconductor chip, functions as a substrate for the integrated circuit transistor switching circuits which are deposited thereon. The integrated circuits are provided with a conventional insulative overlay 12 to protect the integrated circuits on the chip. In this instance, an electrically exposed contact is provided that extends between an individual integrated switching circuit and the exterior of the integrated circuit IC by means of the array of contact pads 14 which are arranged in rows and columns and which rows and column are further identified by their X and Y coordinates in FIG. 4.

Figure 5:
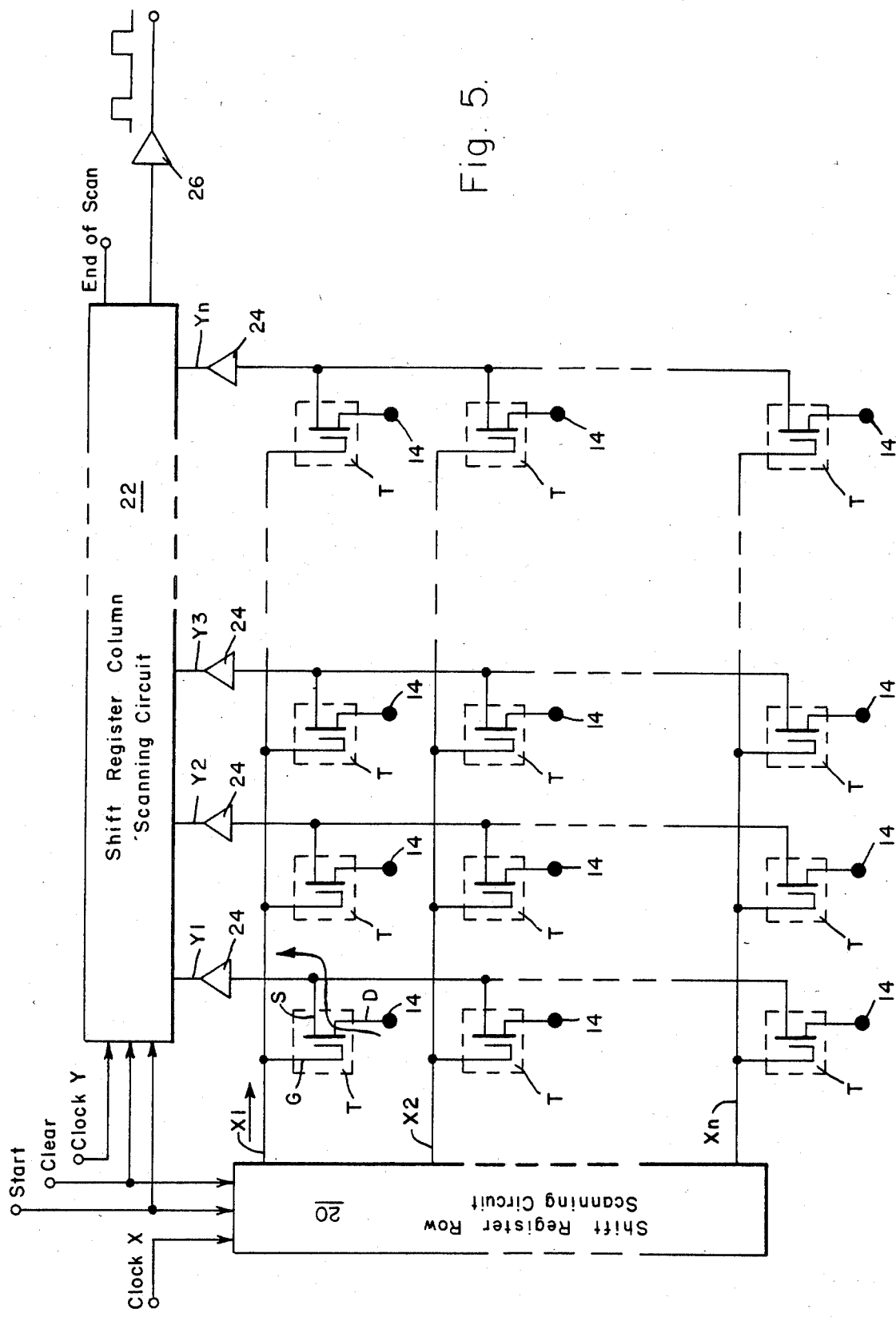
FIG. 5 is a schematic block diagram of the integrated circuits that may be deposited on the semiconductor substrate, in accordance with FIG. 4.

A specific array of switching circuits that may be deposited on the semiconductor chip is illustrated in FIG. 5. In FIG. 5, a simplified arrangement of an array of horizontal, or row, electrodes is utilized to define the X coordinates for the switching circuits along with an array of insulatively spaced column electrodes for defining the vertical, or Y, coordinates of the switching circuits. A transistor switching circuit is arranged at each thus defined X, Y coordinate with each transistor having an electrode connected to an individual row conductor and an electrode individually connected to a column electrode. The remaining electrodes for each of the transistor switching circuits is electrically connected to the corresponding individual contact pads 14 that are exposed from the top surface of the integrated circuit IC. The row electrodes may be identified as the electrodes $X_1, X_2, X_3, \ldots X_N$, reading from the top to the bottom as illustrated in FIG. 5. The column electrodes may be identified as the electrodes $Y_1, Y_2, Y_3m, \ldots Y_N$, reading from left to right in FIG. 5. The rows and columns electrodes are provided with scanning circuits 20 and 22, which are illustrated in block form as a shift register row scanning circuit 20 and a shift register column scanning circuit 22. The shift register scanning circuits are provided with clock pulses from individual sources to sequentially provide an output signal to an individual row electrode and an individual column electrode in a timed relationship, as illustrated in FIG. 5. A start signal is also utilized for commencing the scanning sequence and a common "clear" signal for clearing the registers 20 and 22. Scanning circuits of the needed size are known to have been produced. The scanning of the row electrodes is sequentially $X_1, X_2, X_3$, to the end row $X_N$, with the column electrodes being activated from left to right, $Y_1, Y_2, Y_3$, to the end column $Y_N$ and back to $Y_1$ again to repeat the sequence for all rows and columns.

The presently preferred embodiment of the transistor switching circuit utilizes N-MOS enhancement type transistors. As illustrated in FIG. 5, the gate electrode G for the n-MOS transistor T is connected to an individual row electrode with the source electrode S electrically connected to an individual column electrode. The drain electrode D is connected to the individual contact pad 14. In this arrangement, then, when a contact pad 14 is activated by means of the conductive membrane 16, a current will flow from source, $V_{DD}$ connected to the membrane (See FIGS. 7 and 8) and from the membrane to the drain electrode D through the transistor T and out of the source electrode S to the column electrode. From the column electrode, the signal is coupled to the scanning circuit 22 by means of the individual level restorer circuit 24. The output signals from the scanning circuit 22 are applied to an output buffer circuit 26 and are derived therefrom as a serial train of binary coded signals. The electrical relationship between the scanning circuit 20 and the row conductors is that the row conductors are sequentially activated by the shift register scanning circuit 20 to provide a potential to the gate electrodes G for each of the switching circuits having the common energized row electrode, such as the top row, as illustrated in FIG. 5. During the time interval a row electrode is energized the signals from the column scanning circuit 22 provide sequential circuit paths through the column electrodes to provide a conductive condition through them so that in the event a contact pad 14 for a switching circuit is activated at a time when the row electrode and the column electrode are both activated a signal will be derived from the transistor switching circuit which appears at the output of the scanning circuit 22 and is representative of the particular X and Y coordinates and thereby the location of particular portion of a ridge R for an individual's finger. After all of the column electrodes are scanned, the next successive row electrode is scanned to determine if a further row of switching circuits have been activated by the engagement of the membrane 16 and the contact pads 14. This arrangement continues until all the rows and columns have been sensed. The speed of scanning of the rows and column should be understood to be that the scanning rate for the columns is N times higher than for the row circuits wherein N is equal to the number of columns. In a particular embodiment of the integrated switching circuits, the switching circuits may be arranged on the IC substrate on 50×50 micrometers centers. In such an arrangement there may be 625 horizontal rows and 500 vertical columns. The electrical pads 14 on the face of the integrated circuit IC may be sized on the order of 50×50 micrometers or less. With this arrangement the clock pulse rate that is applied to the scanning circuits may be on the order of three to six megahertz so that the full scan of all of the 625 rows and 500 columns will occur in a time interval of between 50 to 100 milliseconds. It should be noted that this scanning rate is comparable for the time required for one television frame to occur. With the known clock pulse rate and the known pattern of sensing, the coordinate significance of the output signals may be obtained even though they may be recorded in a serial train. The row and column scanning circuits may be deposited on the IC chip along with the transistor switching circuit and the clock pulse generators or be discrete scanning circuits connected to the IC chip.

An important feature of the present invention is the construction of the sensing membrane 16. The membrane 16 is a very thin membrane on the order of 0.05 millimeters. The membrane 16 is preferably made of a flexible but nonstretchable material, such as from a commercially available plastic. Suitable materials for this membrane include Mylar having a vacuum deposited metal layer thereon or Velostat, and electrically conductive plastic manufactured by Minnesota Mining & Manufacturing Corp. The nonstretchable characteristic is preferred so that the underside of the membrane that carries the electrical conductive layer is not stretched and therefore will not be damaged. In the arrangement of FIG. 3, the membrane 16 is stretched fairly taut in extreme proximity to the underlying integrated circuit without touching or making electrical contact therewith. A typical spacing betwen the membrane 16 of FIG. 3 and the integrated circuit IC may be 0.5 millimeters. Because of the minute travel of the membrane 16, it will stretch infinitesimally and thereby assure that the correct switching circuit will be rendered conductive at the points of contact with the contact pads 14 and the conductive layer for the membrane corresponding to the location on the ridges R of an individual's finger.

In the arrangement of the membrane 16 illustrated in FIG. 6, an oversize membrane is utilized with a volume of air captured between the membrane 16 and the top face of the integrated circuit IC. The volume of air may comprise air pressurized above atmospheric pressure. The membrane 16 may have a concave form relative to the integrated circuit IC as illustrated in FIG. 6. With this configuration additional pressure is required to be exerted against the membrane 16 to transform the pattern of ridges R and valleys V from an individual's finger to a corresponding pattern on the membrane and thereby the thus translated membrane pattern will conform more closely to the actual fingerprint pattern. With the nonstretchable characteristic for the membrane 16, the captured air below the membrane is going to increase in pressure due to the initial pressure applied thereto requiring even further pressure to be applied by the individual against the membrane insuring even a closer correspondence between the conductive pattern on the membrane and the ridges and valleys on the fingerprint. The conductive side of the membrane 16 will engage the conductive pads 14 immediately below the membrane and the corresponding ridge pattern on the individual's finger.

The above described embodiment of the finger sensor utilizes a transistor switching circuit as the sensing element for the pressure sensitive membrane having the conductive surface on one side thereof. The alternate embodiment for the sensing element is to substitute charge coupled devices, CCD's, for the transistor sensing circuit with the basic structure of the finger sensor S remaining the same. The charge coupled devices would sense the engagement with the contact pads 14 and the membrane 16 to temporarily load a binary 1 into the sensing CCD cell while a CCD cell that does not have electrical contact with a contact pad is loaded with a binary 0 state. The charge coupled device, CCD, is a device that is well known in the art. The CCD device would be deposited on the integrated circuit IC in lieu of the array of transistor sensing circuits and have the contact pads 14 individual to the cells of the CCD device.

In one specific embodiment of the finger sensors utilizing the charge-coupled device, the sensing transistors are replaced by a number of CCD shift registers whose individual shift register cells are coupled individually to a contact pad 14. The CCD shift registers are arranged in a preselected number of columns as described hereinabove with a single row CCD shift register. In the event the membrane 16 engages a contact 14, the individual cell of the CCD shift register is loaded with a charge packet corresponding to a binary 1 state when a "load cell" signal is coupled to the CCD register. All the cells can be loaded simultaneously or in a sequence, as desired. If no electrical contact is made with the membrane 16 at the time interval the "load cell" signal occurs, the corresponding cell is loaded with a charge corresponding to a binary O and therefore corresponds to a valley V on the fingerprint. After the conductive pattern of ridges and valleys has been transferred to the CCD shift register cells, the stored charges are clocked out of the CCD registers. The preferred clocking technique is a line-by-line transfer of the charges from the column CCD shift register in a manner presently utilized in imaging applications. All of the CCD column shift registers have a clock pulse applied to them simultaneously for transferring the charge packets to the row CCD shift register wherein the charges are shifted out to thereby produce the train of binary coded signals representative of the sensed fingerprint pattern. As in the transistor sensing circuit embodiment, the speed at which the row shift register is clocked is N times the the speed of the column shift clock wherein N is the number of columns.

Figure 9:
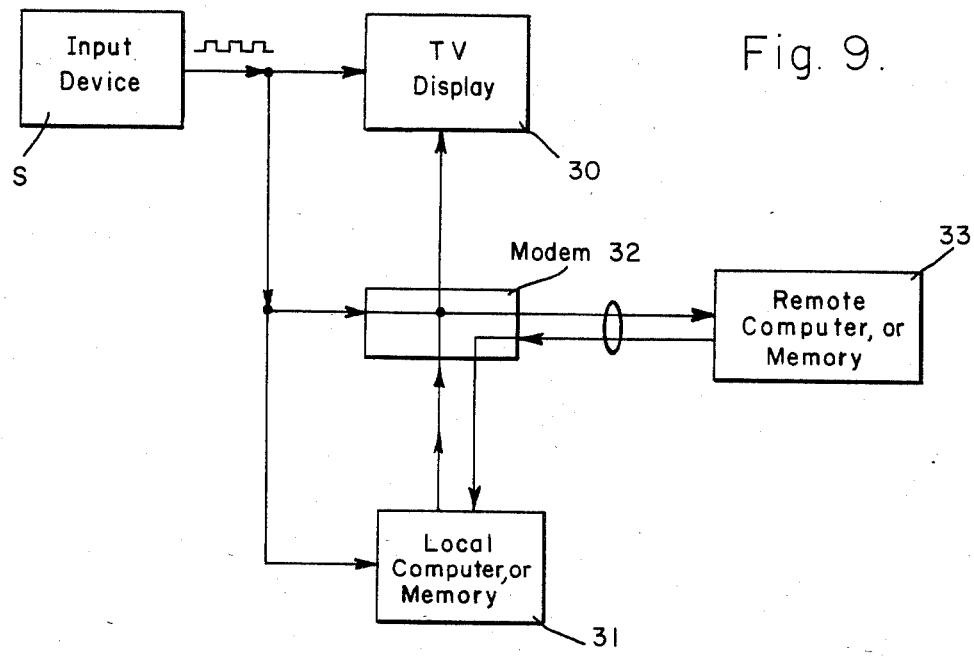
FIG. 9 is a block diagram of an apparatus for utilizing the electrical signals from the fingerprint sensors of FIGS. 3 and 6.

Now referring to FIG. 9, various methods of utilizing the input device or sensor S will be examined. The preferred scanning techniques for the array of X and Y coordinates is similar to that of a television raster as described hereinabove. At the end of line scan, a special signal for signalling the end of a scan can be generated as is common for the present day television receivers. The binary output signals from the sensor S can be displayed directly on the TV display 30 wherein the pattern of ridges and valleys is being reproduced thereon. Each sensing point, for example as denoted in FIG. 2, will be represented by a visible spot on the display 30.

Alternatively, the output signals can be coupled directly to a permanent memory 31 of any of the well known types for storage thereof. The memory may comprise an array of storage cells so that the fingerprint pattern of the signals will assume the location in the memory corresponding to the X and Y coordinates the output signals are representative of. The storage in memory may be at a point remote from the sensor S. As illustrated in FIG. 9, the output signals from the sensor S may be coupled to a linking device 32 in the form of a modem and transmitted to a remote computer or memory.

Figure 10:
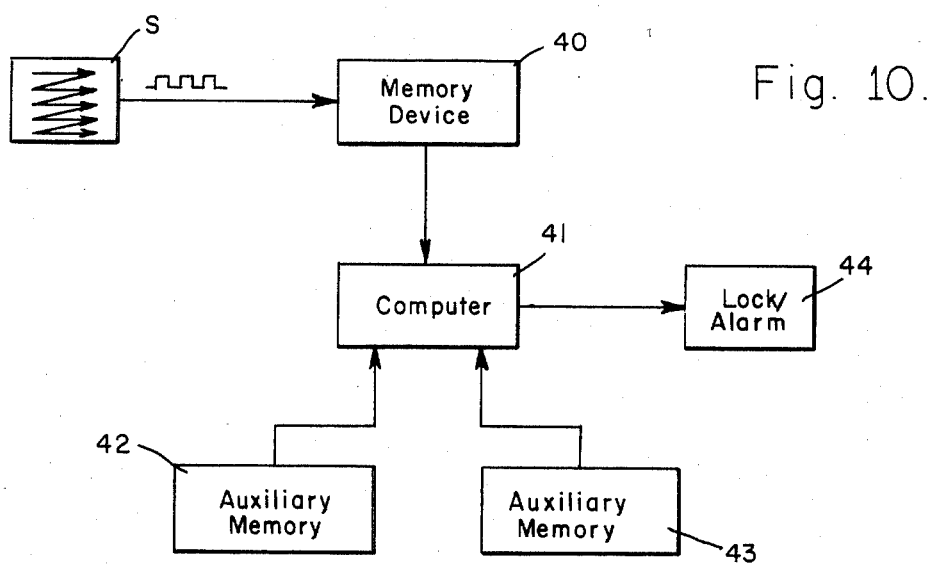
FIG. 10 is a block diagram of a further means of utilizing the electrical output signals from the sensing devices of FIGS. 3 and 6 for the purpose of a high security lock.

FIG. 10 illustrates a block diagram of a high security lock utilizing the output signals from the sensor S. In the system of FIG. 10 the binary output signals from the sensor S are coupled to a binary storage memory 40. The output signals from the memory 40 are, in turn, coupled to a computer 41 for the processing thereof. The computer 41 may have additional storage capabilities in the form of auxiliary memories 42 and 43 coupled thereto. The computer 41 is programmed to manipulate the fingerprint output signals to extract the characteristic features of the fingerprint by well known techniques. This manipulation of the data signals provides a coded, modified fingerprint image that can be matched against similar fingerprint patterns which are stored in the auxiliary memory devices 42 and 43.

The computer 41 is coupled to control a combination lock or alarm 44. If the computer 41 detects a match between the stored fingerprint pattern and the manipulated pattern a signal is emitted to open the lock 44. If no match of fingerprints is detected, the computer 41 will emit a signal to activate an alarm at the lock 44.

A presently known technique for fingerprint matching is disclosed in the publication of Sperry Rand Corporation, of Great Neck, N.Y., entitled "The Arizona Fingerprint Identification Project—An Evaluation", Search Group, Inc., dated August 1977. In the disclosed Sperry technique, a ridge-angle map of a fingerprint is generated and then, utilizing pattern recognition techniques, extracts the pertinent topographical features of the fingerprint from it. The topographical features may be the arches, loops, or whorls of the fingerprint pattern. The matching of the fingerprints is accomplished by comparing these features.

Another fingerprint matching technique is based on the comparison of the locations and orientations of the minutiae of the fingerprint along with the number of ridges between the minutiae. The minutiae may comprise ridge endings and bifurcations. A disclosure of such a minutiae based fingerprint matching system is disclosed in the publication entitled "The Latent Fingerprint Matcher" published by The Bureau of Standards in August 1978, NBS Special Publication 500-36.

I claim:

1. A method for sensing the ridge and valley fingerprint pattern of a person's finger and translating said pattern into electrical signals representative thereof, including the steps of:
    stretching a membrane having a conductive surface over an array of electrically conductive contact pads which are electrically insulated from each other and arranged so that each contact pad defines an "X,Y" coordinate of said array, the conductive surface being opposite said pads and spaced therefrom so it is not in electrical contact therewith;
    connecting a separate electronic switching circuit to each of said pads;
    pressing the person's finger against said membrane such that the ridge portions of said person's fingerprint pattern forces the membrane into electrical contact with the pads there-opposite, thereby activating the electronic switching circuits connected to said pads; and
    scanning the electronic switching circuits to generate an electrical output signal in accordance with the activated and nonactivated switching circuits which represents the fingerprint pattern.

2. A sensor for transforming the ridge and valley fingerprint pattern of a person's finger into corresponding electrical output signals comprising:
    substrate means having row and column electrodes arranged thereon in an electrically insulated spaced apart relationship to form a grid array which defines a plurality of "X,Y" coordinates;
    an array of electrically conductive contact pads, arranged on said substrate in accordance with said array, said pads being electrically insulated from each other, each of said pads corresponding to a separate one of the "X,Y" coordinates of said array;
    a plurality of electronic switching circuit means, each having a first electrode connected to one of said row electrodes, a second electrode connected to one of the column electrodes, and a third electrode connected to one of said contact pads;
    means for providing a voltage potential between at least two of said switching circuit means electrodes;
    a membrane having an electrically conductive surface;
    holding means for mounting said membrane in overlying relationship with the array of contact pads with the conductive surface thereof directly opposite said array of contact pads but not in electrical contact therewith, such that when the person's finger is pressed against said membrane, the ridge portions of the person's fingerprint pattern brings the portions of the membrane there-opposite into electrical contact with the opposing contact pads to activate the switching circuit means connected thereto, the valley portions of the fingerprint pattern not producing such electrical contact or activation of the switching circuit means; and
    scanning circuit means for sequentially scanning the row and column electrodes to produce sequential electrical output signals indicative of which of said pads are being brought into contact with the membrane by the finger ridge portions and which of said pads are not being brought into such contact, said electrical signals representing the ridge-valley fingerprint pattern.

3. A finger sensor, as defined in claim 2, wherein said transistor switching circuits each comprise an n-MOS enhancement type transistor with said first electrode comprising the transistor gate electrode, the second electrode comprising the transistor source electrode and the third electrode comprising the transistor drain electrode.

4. A finger sensor, as defined in claim 2 wherein said membrane is secured to said holding means to assume a preselected concave configuration relative to said wafer and to captive the air between the holding means and said membrane.

5. A finger sensor as defined in claim 2 including signal processing means coupled to receive the output signals from said scanning circuit means for identifying the sensed fingerprint pattern.

6. A finger sensor, as defined in claim 2 wherein said substrate means comprises a silicon wafer.

* * * * *

UNITED STATES PATENT AND TRADEMARK OFFICE
CERTIFICATE OF CORRECTION

PATENT NO. : 4,577,345

DATED : March 18, 1986

INVENTOR(S) : Igor Abramov

It is certified that error appears in the above-identified patent and that said Letters Patent is hereby corrected as shown below:

IN THE ABSTRACT:

On line 23 after "sensing", delete "signals" and insert "circuits"

On line 24, after "pattern", delete "representative of a ridge" and insert "corresponding to ridges".

IN COLUMN 1:

On line 9, after "pattern", delete "to" and insert "into".

On line 32, after "4,322,163", delete "patent".

On line 47, after "theoretical", delete "devices".

On line 57, after "pattern", delete "to" and insert "into".

IN COLUMN 2:

On line 28, after "pattern", delete "to" and insert "into".

On line 55, after "semiconductor", delete "waver" and insert "wafer".

UNITED STATES PATENT AND TRADEMARK OFFICE
CERTIFICATE OF CORRECTION

PATENT NO. : 4,577,345

DATED : March 18, 1986

INVENTOR(S) : Igor Abramov

It is certified that error appears in the above-identified patent and that said Letters Patent is hereby corrected as shown below:

Column 5, line 53, after "$Y_2$," delete "$Y_{3m}$" and insert -- $Y_3$ --.

Column 7, line 65, after "binary", delete "O" and insert -- $\emptyset$ --.

Column 8, line 18, after "binary", delete "O" and insert -- $\emptyset$ --.

Signed and Sealed this

Second Day of September 1986

[SEAL]

Attest:

Attesting Officer

DONALD J. QUIGG

Commissioner of Patents and Trademarks